United States Patent Office 3,438,289
Patented Apr. 15, 1969

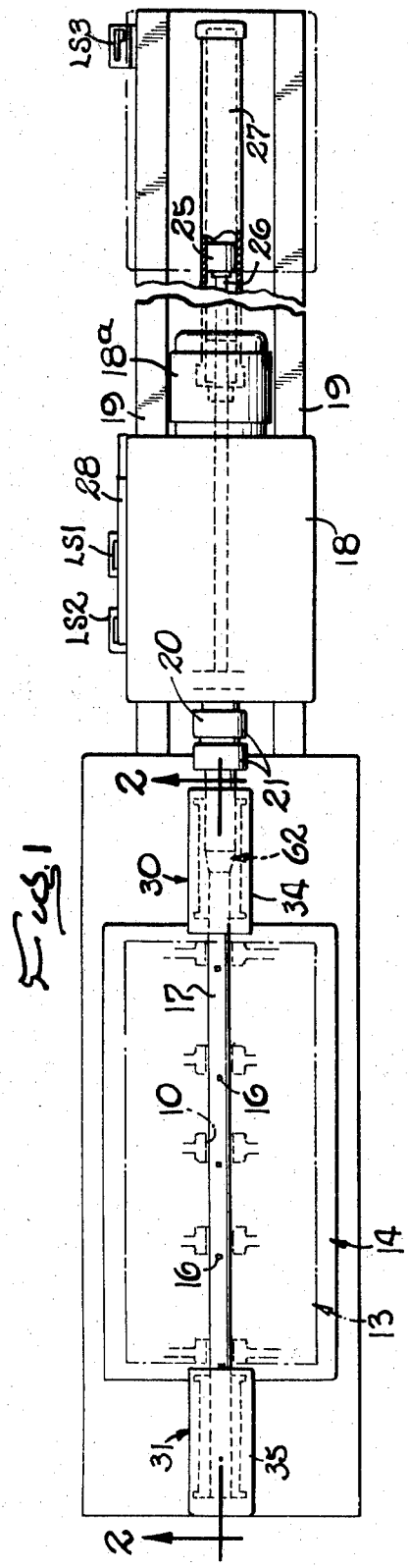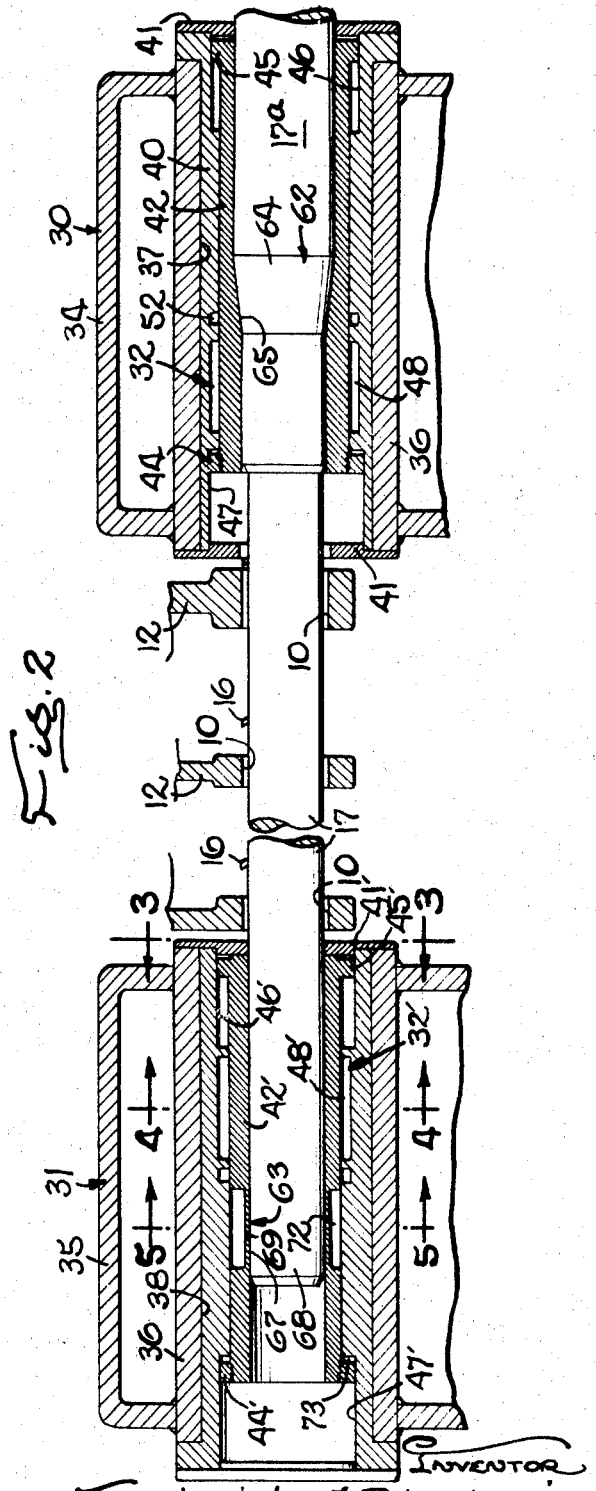

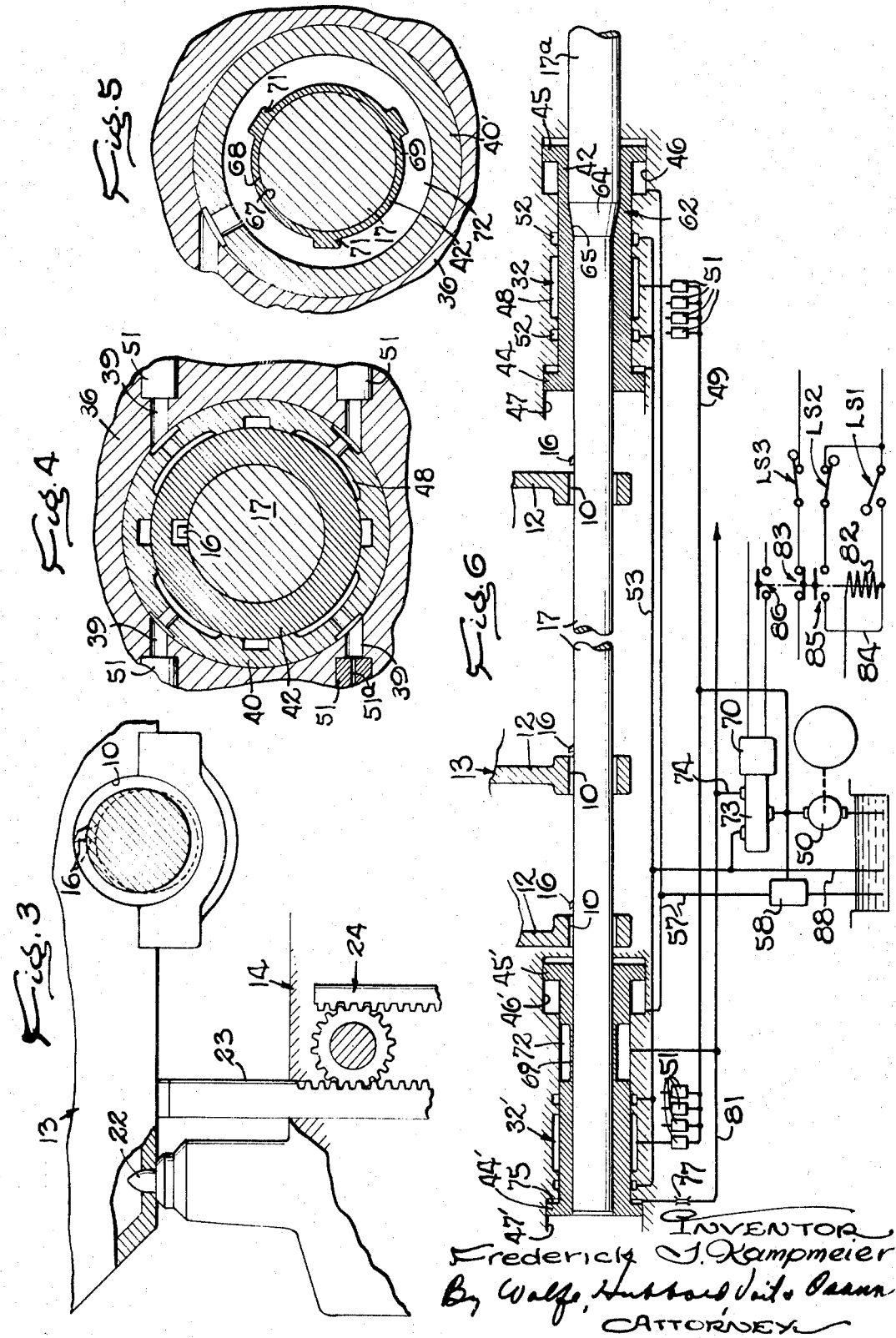

3,438,289
BORING MACHINE WITH VIBRATIONLESS BORING BAR
Frederick J. Kampmeier, Rockford, Ill., assignor to The Ingersoll Milling Machine Company, Rockford, Ill., a corporation of Illinois
Filed June 8, 1967, Ser. No. 644,606
Int. Cl. B23b 47/00, 29/02; F16c 7/04
U.S. Cl. 77—56                                                12 Claims

ABSTRACT OF THE DISCLOSURE

A boring bar, after being inserted through holes in a workpiece and axially spaced bushings supported by hydrostatic bearings, is coupled rigidly to such bushings while the bar is being advanced to bore the holes. The bushings are forced apart during the boring to maintain the bar under longitudinal stress and thereby change the natural vibration frequency of the bar.

BACKGROUND OF THE INVENTION

This invention relates to a boring machine in which a boring bar, after being inserted through holes in a workpiece and inboard and outboard bearing bushings, is coupled rigidly to the bushings for the boring during which the bushings are supported in hydrostatic bearings and shift axially with the bar as the latter with the boring teeth are rotated and fed through the rough holes.

SUMMARY OF THE INVENTION

The present invention aims to increase the accuracy of bores finished in a machine of the above character by stressing the bar longitudinally during the boring so as to change the natural frequency of lateral vibration of the bar and prevent vibration that would result in inaccuracy in the location and geometry of the bores. Such stressing is achieved by exerting oppositely acting and axially directed pressures on the two bushings after coupling thereof to the boring bar. Preferably, these forces are applied to the bushings of the hydrostatic bearings and in directions to place the boring bar under longitudinal tension of sufficient magnitude to prevent objectionable lateral vibration of the bar in the course of the boring.

BRIEF DESCRIPTION OF THE DRAWINGS

FIGURE 1 is a fragmentary and schematic plan view of a boring machine embodying the novel features of the present invention.

FIG. 2 is a fragmentary section taken along the line 2—2 of FIG. 1 but showing a different position of the boring bar.

FIGS. 3, 4 and 5 are fragmentary sections taken respectively along the lines 3—3, 4—4 and 5—5 of FIG. 2.

FIG. 6 is a schematic view and circuit diagram.

DESCRIPTION OF THE PREFERRED EMBODIMENT

The invention is shown in the drawings incorporated in a machine tool of the type commonly used for finish boring bearing holes 10 in the crosswebs 12 of an engine block 13 while the latter is secured to and located accurately in a fixture 14 on a bed structure 15. The boring is effected by short teeth 16 spaced along and projecting radially from a tool spindle or bar 17 projecting cantilever fashion from a head 18 which is supported by the bed to slide back and forth along ways 19. The bar is alined with and supported through the medium of conventional floating tool holders 21 mounted on the outer end of a drive spindle 20 which is journaled in the head 18 to aline the axes of the bar and the holes 10 as shown in FIG. 2 when the workpiece is in boring position.

Conventional means (not shown) operates after completion of each boring operation to stop the rotation of the spindle 17 with each tooth 16 in the predetermined upright position shown in FIGS. 1, 2 and 3. While the boring bar is being projected through the rough holes and during retraction from the finished holes, the fixture is shifted vertically to offset the bores 10 along the radius of the positioned tooth and to the position shown in phantom in FIG. 3, the cutter teeth thus being adapted to pass through the hole walls without contact during the advance and retraction of the spindle. After being loaded into the fixture, a workpiece, while engaging dowels 22, is supported by plungers 23 adapted to be raised and lowered by a suitable actuator 24 activated at proper times in the machine cycle.

The boring bar is driven at proper speed by an electric motor 18a on the head 18 and the latter is advanced and retracted by a suitable power actuator which may as shown be of the hydraulic type comprising a piston 25 having a rod 26 secured to the head and slidable in a cylinder 27 secured to the bed. Conventional mechanism (not full shown) is provided for controlling the flow of fluid to opposite ends of the cylinder to advance and retract the tool head 18 in an automatic cycle including first advancing the head rapidly from the retracted position shown in phantom in FIG. 1 to the position shown in FIGS. 1 and 2, then continuing the advance of the head at a slower feed rate to effect the boring, and finally retracting the spindle rapidly out of the workpiece to the starting position. Such control of the head actuator may be effected through conventional circuitry by a switch LS1 actuated by a cam 28 on the head when the latter completes the rapid approach (FIG. 2), a switch LS2 which is actuated by the cam when the boring of the work holes is completed (FIG. 1), and a switch LS3 which interrupts the rapid return of the head in the starting position. With the spindle retracted, the work may be unloaded from the fixture and another piece placed thereon.

In the rapid advance of the head, the spindle 17 is projected through an inboard bearing support 30, the work holes 10 and into an outboard support 31. These supports include casings 34 and 35 rigidly secured to and upstanding from the top of the bed 15 at opposite ends of the fixture 14 and enclosing and welded to solid blocks 36 which are formed with bores whose walls 37 and 38 are closely concentric with the axis of the spindle. The inboard bearing support includes a sleeve 40 which extends through and is telescoped closely within the bore 37 and is fixed therein by a cap 41 secured against the end of the block 36. Within the sleeve is a bushing 42 which is supported by a hydrostatic bearing 32 for axial shifting relative to the sleeve, which receives the somewhat enlarged portion 17a of the tool spindle with ample sliding clearance, and which becomes coupled to this spindle for the boring operation. To accommodate the full range of feeding of the spindle during the boring, outturned flanges 44, 45 at opposite ends of the bushing are slidable with narrow clearances within internal cylindrical end portions 46 and 47 of the sleeve.

The hydrostatic bearing 32 is constructed in accordance with well known design techniques and herein comprises four pressure pads supplied with oil under high pressure, for example 1000 p.s.i., each pad comprising a rectangular chamber 48 formed in the inner wall of the sleeve 40 and opening toward the opposed outer cylindrical surface of the bushing. A continuous flow of oil at substantially constant pressure from the outlet 49 of a high pressure pump 50 is delivered to the pads through individual branch passages 39 (FIG. 5) in the block 36 each including a compensating element 51 in the form of an orifice 51ª (FIG. 4) whose diameter, for example .025 of an inch, may be fixed or, if desired, variable to provide a constant pressure drop. The orifice size is correlated with the pad pressure and the sill clearances, for example .0025 of an inch, around the pads and between the opposed walls of the sleeve and bushing. The arrangement is such that flow of pressure fluid to the pads balances the escape of fluid outwardly through the laminar flow passages or clearances. The escaping fluid collects in annular grooves 52 in the sleeve and flows to the drain line 53 through passages in the block 36.

The bushing 42 thus mounted is supported rigidly by the oil in the pads but floats thereon as permitted by the clearances around the flanges 44, 45 and automatically adjusts for and accommodates changes in radial loading in the manner well understood in the hydrostatic bearing art. Thus, the bushing, after coupling to the tool spindle, is always held centered precisely within the sleeve in spite of fluctuating radial loads that are imposed on the tool spindle during the boring.

Provision is made for continuously urging the bushing 42 axially and toward the head 18 to a position which, when the spindle is retracted, is determined by abutment of the bushing end and the end cap 41. For this purpose, the bushing flange 45 is utilized as a piston slidable in the cylinder 46 which communicates continuously with a line 57 which in turn communicates in the present instance with the pump outlet 49 through a pressure reducer 58. The biasing force, for example 250 p.s.i., exerted on the piston 45 is easily overcome in the advance of the head 18 by its actuator after the spindle becomes coupled to the bushing 42 in a manner to appear presently.

The construction of the outboard bearing support 31 for receiving the free end of the spindle near the end of the rapid approach movement and supporting the same during the boring is generally the same as that of the inboard bearing support 30 and accordingly, the corresponding parts are indicated by the same but primed reference numerals. As before, the support includes a stationary sleeve 40' fixed in the block 36 and a bushing 42' supported within the sleeve by a hydrostatic bearing 32' and slidable axially against a hydraulic biasing force exerted on a piston 45'. Such force is provided by connecting the cylinder 46' with the low pressure line 57. That portion 17ª of the spindle which is disposed in the inboard bushing 42 during the boring operation is made somewhat larger than combined diameter of the rest of the spindle and each tooth 16 so that substantially the full length of the spindle may be retracted through the bushing 42 and beyond the inboard end of the workpiece.

Coupling devices 62 and 63 are provided for joining the tool spindle rigidly to the respective bushings 42, 42' automatically in the movement of the head 18 when the boring teeth 16 reach the position shown in FIG. 2 adjacent the rough work holes. These devices may take different forms but in any case are such as to allow oppositely acting forces to be exerted on the spindle to maintain the same during the boring under longitudinal stress of sufficient magnitude to avoid objectionable lateral vibration of the spindle at its natural frequency.

In the present instance, the coupling of the spindle to the inboard bearing bushing 42 is effected by the abutting engagement and accurate seating at the end of the rapid approach of complemental tapers 64 and 65 disposed intermediate the ends of the bushing and formed on the exterior of the spindle and the interior of the bushings, the tapers converging away from the head at a cone angle of about ten degrees. By the seating of the spindle taper 64 within the tapered socket 65 of the bushing 42, the spindle is centered precisely relative to the bushing and coupled rigidly and frictionally to the bushing, the taper 64 constituting a positive stop limiting the movement of the bushing under the biasing pressure exerted on the piston 45 while permitting retraction of the spindle through the bushing during rapid return of the head 18. With the tapers seated and the spindle thus coupled to the bushing, the latter is utilized as a medium for rendering the hydrostatic bearing 32 effective in supporting the spindle during the relative short further advance of the spindle at the feed rate required for the boring, the bushing advancing with the head 18 within the sleeve 40 and against the reverse biasing force exerted on the bushing piston 45.

The coupling device 63 is adapted, after being activated, to hold the outboard end of the spindle 17 and the bushings 42' against relative movement in either direction. Herein, the coupling surfaces 67, 68 of this device are cylindrical, one being a rigid part of the spindle and the other the internal surface of one or more thin and radially flexible webs 69 which may be formed by cutting away substantial legnths of the metal of the bushing 42' around the latter. Preferably, the web is divided into a plurality of angularly spaced parts joined at adjacent ends as shown in FIG. 5 by rigid ribs 71 paralleling the bushing axis and rigidly spanning opposite end portions of the bushing.

The webs 69 define the bottoms of arcuate chambers 72 coacting with the interior of the sleeve 40' to form a hydraulic actuator which is activated in response to closure of the switch LS1 as the head completes its rapid approach movement. Such activation is effected by energization of a solenoid 70 to open a valve 73 and admit pressure fluid through a pipe 74 to the coupling chamber 72 at pump pressure under which the webs 69 are flexed inwardly and pressed against the spindle surface 68 thus locking the spindle and the bushing 42' rigidly together.

In accordance with the present invention and after rigid coupling of the spindle and bushing 42' by the squeeze clamp 67, 68, the length of the spindle between this clamp and the inboard coupling are placed under longitudinal stress, preferably tension, by exerting on the bushing 42' an axially directed pressure substantially greater than the constant biasing force thereon as applied to the outboard face of the piston 45'. Herein the tensioning force is derived hydraulically from the outlet of the pump 50 and is applied to an end face 75 of the piston 44' and through a pipe 81 communicating with the line 74 but including a restriction or sequence valve 77 for momentarily delaying the exertion of the bar tensioning force. By virtue of the higher pressure, 2000 p.s.i. in this instance, exerted on the piston face 75 as compared to the lower pressure, for example 250 p.s.i., exerted on the substantially equal area of the piston 45', the difference in the two pressures is exerted in the direction of the free end of the spindle thus drawing the spindle taper 64 more tightly into the bushing seat 65 so as to place the intervening length of the spindle under longitudinal tension equal to the difference between the pressures acting on the pistons 44' and 45'. If desired, the same longitudinal stressing of the boring bar may be achieved by making the areas of the pistons 44' and 45' of different sizes and applying the same pressure to each area during the boring.

*Operation*

During the boring of successive workpieces in the machine above described, the pump 50 operates continuously to supply fluid to the line 49 and through the pressure reducer 58 to the line 57 leading to hydrostatic bearings 32, 32' and the cylinders 46, 46'. In the retracted position of the head 18, the boring teeth 16 and the workpiece are disposed as shown in phantom in FIG. 3. In each cycle, the head advances at the rapid traverse rate until the switch LS1 is closed by the cam 28 thus energizing a relay 82 to open a normally closed switch 83 in series with the cam actuated switch LS3, to close a switch 85 in a holding circuit 84 for the relay including the cam operated switch LS2, and then to close a switch 86 for energizing the solenoid 70 to open the valve 73.

High pressure fluid is thus admitted through the lines 74 to the actuator 24 for lowering the workpiece to aline the holes 10 with the boring teeth 16, to the chambers 72 of the squeeze clamp for locking the bushing 42′ to the spindle 17, and to the branch 81 leading to the outboard cylinder 47′ behind the face 75 of the piston 44′. Because of the restriction 77, the attainment of full pressure against this face is delayed until the workpiece has been positioned properly and the squeeze clamp energized.

Closure of the switch 86 is also utilized through appropriate and conventional circuitry to start the spindle motor 18ᵃ and change the advance of the head 18 to a slow feed rate for effecting the boring. Upon completion thereof, the switch LS2 is opened by the cam 28 thus breaking the holding circuit to deenergize the relay 82 and the solenoid 70 to reverse the valve 73 and connect the pressurized elements to the drain line 88. As a result, the motor 18ᵃ is stopped with the spindle in the proper angular position, the workpiece is raised, and the tension on the spindle and the coupling to the bushing 42′ are released. The spindle is thus freed from the bushings which are retracted to normal positions (FIG. 2). Rapid withdrawal of the spindle from the workpiece is initiated by closure of the relay switch 83 and continues until LS3 is opened by the cam 28 when the head becomes fully retracted.

The longitudinal stressing of the bar during the boring may be varied as desired by employing pressures of different values or changing the effective areas of the pistons 44′, 45′ to provide the desired resultant pressure acting on the outboard end portion of the boring bar and against the inboard end as held positively by seating of the tapers 64, 65. In any case, the stressing is such as to change the natural frequency of lateral vibration of the boring bar between the supporting bushings 42, 42′ and thereby eliminate objectionable harmonic conditions resulting in vibration of the teeth 16 that would affect the accuracy of the bores finished by the feeding of the rotating teeth through the work holes 10.

I claim:

1. In a machine tool, the combination of, two supports mounted for relative movement along a straight path, a power rotated tool spindle mounted cantilever fashion on the movable one of said supports and projecting therefrom along said path, a bushing for receiving said spindle in telescoped relation, means on the other support providing a hydrostatic bearing surrounding said bushing and supporting the same for rotation about and for axial movement along a precisely located axis substantially coincident with the axis of said spindle, mechanism for advancing said movable support along said path to move the spindle axially within said bushing and then feed the spindle forwardly for machining the workpiece, coupling means activated automatically after entry of said spindle into said bushing to join the two together rigidly for rotation and shifting in unison within said hydrostatic bearing, and power actuated means for thereafter applying to said bushing an axially directed pressure for holding said spindle under longitudinal stress during machining of the workpiece.

2. A machine tool as defined in claim 1 in which said power actuated means operates to place said spindle under longitudinal tension of sufficient magnitude to avoid substantial lateral vibration of the spindle during machining of the workpiece.

3. A machine tool as defined in claim 1 in which said power actuated means comprises a piston on said bushing slidable in a stationary cylinder receiving pressure fluid at one end so as to place said spindle under longitudinal tension.

4. A machine tool as defined in claim 1 including means continuously biasing said bushing in a direction opposite said spindle feed, said power actuated means acting on said bushing in the opposite direction and overcoming such biasing means.

5. A machine tool as defined in claim 1 in which said coupling means includes a thin wall formed on said bushing intermediate the ends thereof and flexible into rigid gripping engagement with the spindle by hydraulic pressure exerted on the wall.

6. A machine tool as defined in claim 4 in which the biasing of said bushing and the longitudinal stressing of said spindle is effected by exerting hydraulic pressure on oppositely facing surfaces on piston elements rigid with said bushing and slidable in a stationary cylinder.

7. The combination of two supports mounted for relative movement back and forth along a straight path through a predetermined range, a power rotated spindle mounted cantilever fashion on the movable one of said supports and projecting therefrom along said path, inboard and outboard bushings alined axially and spaced along the other support each for receiving said spindle in telescoped relation, hydrostatic bearings on said other support surrounding said bushings and supporting the same for rotation about and for axial movement along a precisely located axis, means for advancing said movable support along said path to correspondingly and initially advance the spindle through the inboard bushing and into the outboard bushing, coupling devices actuated automatically when said spindle reaches a predetermined position to join the internal surfaces of said bushings with the exterior of said spindle for advance of the bushings and spindle as a unit during the continued advance of said movable support, and mechanism acting during such continued advance to exert oppositely directed forces of substantial magnitude on the respective bushings and along the spindle whereby to maintain the spindle under longitudinal stress during the continued advance.

8. A machine tool as defined in claim 7 in which said oppositely directed forces are of sufficient magnitude to prevent objectionable lateral vibration of the portion of the spindle spanning said bushings during the boring of a hole in a workpiece by a tool projecting from such portion.

9. A machine tool as defined in claim 7 in which said oppositely directed forces maintain said intervening spindle portion under longitudinal tension.

10. A machine tool as defined in claim 9 in which said oppositely directed forces are exerted on piston elements rigid with and surrounding the respective bushings.

11. A machine tool as defined in claim 7 in which said coupling device in said inboard bushing comprises complemental tapers on the interior of the bushing and exterior of the spindle positioned for abutting engagement when said movable support reaches said predetermined position.

12. A machine tool as defined in claim 7 in which said coupling device in said outboard bushing comprises the outer surface of the spindle and an opposed thin and radially flexible intervening length of the bushing wall, and means for applying hydraulic pressure to the exterior of said thin wall to flex and squeeze the same inwardly into secure clamping engagement with the spindle.

References Cited

UNITED STATES PATENTS

| | | | |
|---|---|---|---|
| 2,432,943 | 12/1947 | Shaw | 77—57 |
| 2,643,554 | 6/1953 | Sperisen | 77—3 |
| 2,671,700 | 3/1954 | Seyffert | 308—9 |
| 3,189,389 | 6/1965 | Heer | 308—9 |
| 3,244,028 | 4/1966 | Dever et al. | 77—1 |
| 3,382,739 | 5/1968 | Jacobson | 77—56 |

GERALD A. DOST, *Primary Examiner.*

U.S. Cl. X.R.

77—1, 57; 82—30; 90—11; 308—5, 9